UNITED STATES PATENT OFFICE.

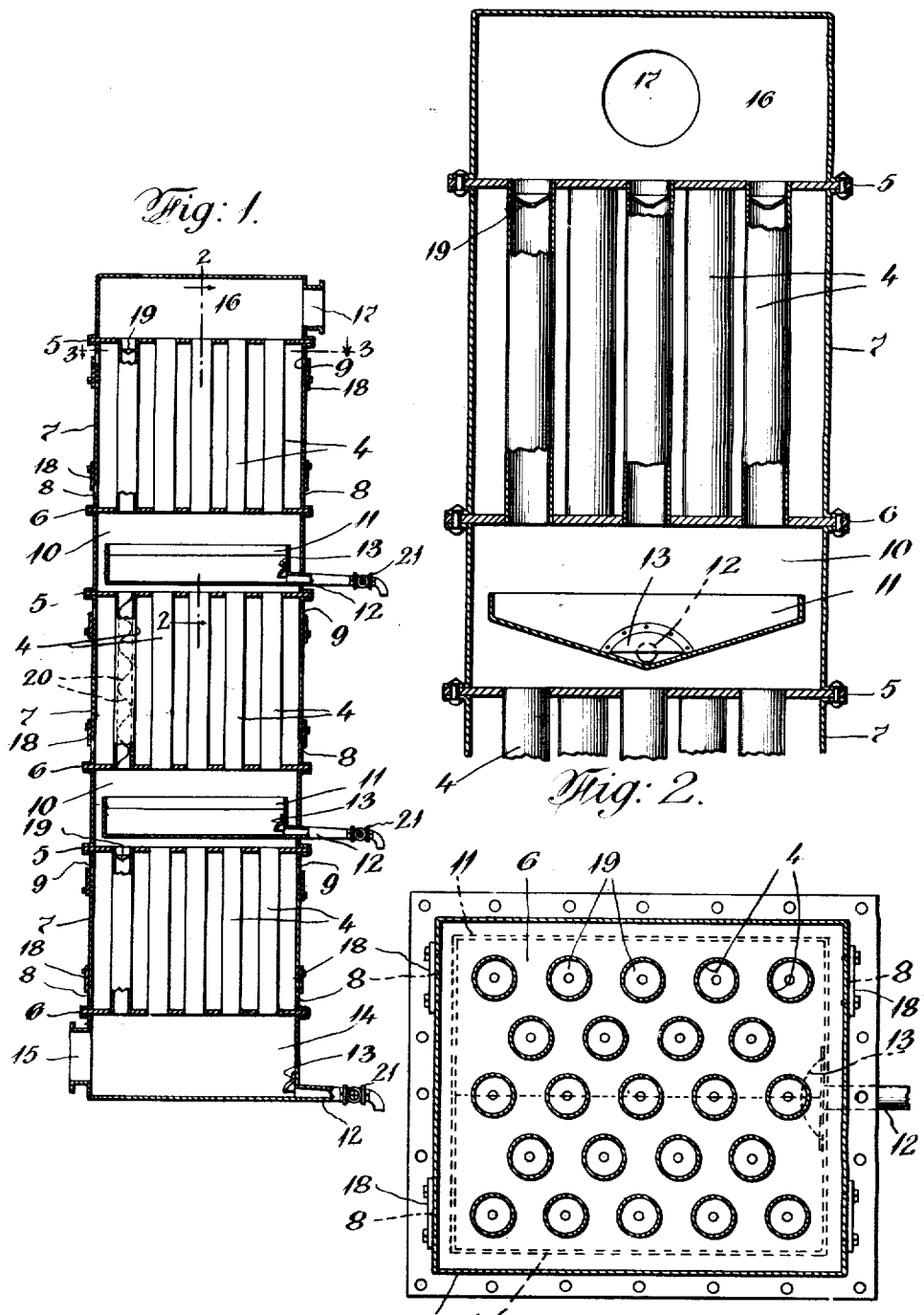

JOHN L. GRAY, OF WEBSTER GROVES, MISSOURI.

APPARATUS FOR USE IN CONNECTION WITH THE DISTILLATION OF PETROLEUM AND PRODUCTS THEREFROM.

1,192,889.  Specification of Letters Patent.  Patented Aug. 1, 1916.

Application filed December 30, 1914. Serial No. 879,619.

*To all whom it may concern:*

Be it known that I, JOHN LATHROP GRAY, a citizen of the United States, residing in Webster Groves, county of St. Louis, State of Missouri, have invented a certain new and useful Apparatus for Use in Connection with the Distillation of Petroleum and Products Therefrom, of which the following is a specification.

The frictional distillation of compound vapors, as vapor of crude petroleum, forming the subject of this invention is based on the principle of gradually cooling a stream of the vapor and from each successive slight fall of temperature thereof separately extracting the constituent condensate due to such graduated cooling.

The object of the invention is to produce, from one heating of the crude material, any desired number of the constituents of the crude material as isolated segregations, having as closely as possible fixed densities and boiling points. To this end the condenser of this invention comprises a sufficient number of units or sections to condense all the material it is desired to separate. There may be as many products as there are sections. Each product may be taken from the section in which it is condensed, or but few products may be taken from the condenser. These said units are preferably vertically arranged, and through them the compound vapor will consecutively flow. Each unit embodies an air cooled tubular condenser, a chamber beneath it and a condensate collecting trough in the chamber into which the condensate formed in the tubes will fall. Each trough is provided with a discharge spout and a sealing trap, so arranged that the spout will be sealed and so prevent the passage of vapor through the spout when the production of the condensate equals or exceeds the rate of its discharge therefrom, and be unsealed when the trough becomes empty and the flow ceases, thus preventing heavy or waxy material from collecting and stopping the spouts.

In the accompanying drawings forming part of this specification, to which reference will now be had: Figure 1 is a vertical sectional view of an apparatus adapted to carry out the fractional distilling process of this invention: Fig. 2, a vertical transverse section, on an enlarged scale, taken on the line 2, 2, of Fig. 1; and Fig. 3, a horizontal section, on an enlarged scale, on the line 3, 3, Fig. 1.

The distilling apparatus of this invention is composed of a number of condensing units, of similar construction, vertically arranged. Each unit comprises a series of tubes 4 secured in head plates 5 and 6; a casing 7 surrounding the tubes and provided with openings 8 and 9 at their lower and upper parts for directing currents of air to and around the tubes 4; a chamber 10 located beneath the air cooled tubes and provided with means, as flanges, for connection to the plates 5 and 6 of adjacent sets of tubes, and a condensate receiving trough 11 located in the chamber 10 having a discharge spout 12 and a trap seal 13. The bottom of the trough inclines downwardly from both sides toward the center, the spout being located at one end of the trough at the lowest part thereof. Thus a comparatively small quantity of condensate, say one barrel, will seal the spout and the trough will have large holding capacity, of say seventy barrels. The openings 8 and 9 are made variable by sliding gates 18, which may be set open sufficiently for cleaning purposes. The condenser tubes 4 may be provided with means for retarding the flow of the vapors to increase the cooling effects of the air thereon. These retarders may consist of perforated plates as shown at 19, or helical partitions 20, located in the tubes.

The troughs 11 have open areas large enough to receive the dripping condensates from all of the condensing tubes of each set as shown at Fig. 3, and the bottoms are sloped or inclined toward the centers and the discharge spouts 12 placed at one end of the lowest part thereof, as shown at Fig. 2. The trap seal 13 is a cup-shaped piece or hood with its lower edge on, or about on, a level corresponding to the center of the spout opening, so that the spout is sealed, as soon as the condensate reaches this level, against escape of the vapor. The spouts 12 are provided with valves 21 to regulate the flow of the condensates through the spouts. When the flow from the spout ceases or reduces the level of the condensate to the edge of trap 13, the seal becomes broken, and the contents of the trough will be fully discharged and accumulation of heavy or waxy material and consequent stoppage of the outlets will be prevented. A given rate of flow through the spouts will cause the seals to become effective, and they will remain so under an increased rate of flow—the troughs and spouts being adequate to meet changes of condensation.

The plate 6 of the lowermost set of tubes is attached to the top of a chamber 14 provided with an opening 15 adapted to be connected to, or placed in communication with, the goose neck or vapor discharge pipe of the still in which the material to be separated is heated. This chamber has a condensate discharge spout 12 and trap seal 13, similar to those previously described.

A chamber 16 is seated on the top plate 5 of the uppermost set of tubes 4 and is provided with an outlet opening 17.

A feature of the invention, due to the construction and arrangement of parts, is that the underside of each condensate trough 11 acts as a baffle plate for the vapor passing upwardly through the set of condensing tubes 4 immediately below it, and any condensation occurring thereon will fall through and be under the influence of the upwardly ascending vapor in the said tubes. This trough here referred to against which the vapor impinges will contain a condensate of lower temperature than that of such impinging vapor and to that extent assist in the condensation of the vapor and the heat of the vapor will also cause the evaporation of any of the light products that may have been absorbed by the condensates accumulated in the troughs. The vapor, after striking the bottom of the trough, will be deflected toward and against the sides of the walls of the chambers 10 and thereby be agitated and so be thoroughly remixed before passing to the next condensing unit.

It will be understood that the condensing surfaces of the units may be adequately varied according to the necessary ranges of temperature required to produce the strength or densities of the selected various condensates.

I have shown three of the air cooled condenser units vertically arranged, but it will be understood that the invention is not limited to this number of units; also that a number of condensers may be arranged side by side and connected in series for the flow of the vapor to pass alternately up and down through them.

I claim:

1. The combination with a vertical air cooled tubular condenser of a condensate receiving trough located beneath the horizontal area of the chamber being greater than that of the trough to afford passages for the vapor between them, the tubes, a chamber in which the trough is located, a discharge spout extending from the trough and through a wall of the chamber, and a baffle plate above the tubes against which the vapor passing upwardly through the tubes impinges and the condensate formed on the baffle plate falls through the tubes into the trough.

2. The combination with a vertical air cooled tubular condenser of a condensate receiving trough located beneath the tubes, a chamber in which the trough is located, a discharge spout extending from the trough and through a wall of the chamber, a baffle plate above the tubes against which the vapor passing upwardly through the tubes impinges and the condensate formed on the baffle plate falls through the tubes, and a trap seal, the lower edge of which is on a level with the center of the spout.

3. In a fractional distilling apparatus a series of air cooled condensing units vertically arranged, each unit comprising a series of vertical tubes, a chamber beneath the tubes into which the vapor from the preceding unit passes, a condensate receiving trough located in and independent of the chamber and into which the condensate from the series of tubes falls; the arrangement being such that the vapor impinges against the bottom of the trough and flows under and around the sides of the trough in its passage to the said series of tubes.

4. An air condenser comprising a series of vertical tubes, a chamber beneath the tubes, and a condensate receiving trough having its bottom inclined in two directions toward the center located in the chamber and separated therefrom and into which the condensate from the tubes falls, openings in the bottom of the chamber beneath the trough through which the vapor passes and impinges against the bottom of the trough and passes upwardly around it to the condensing tubes, and a discharge spout extending from the lowest part of the trough through a wall of the chamber.

5. An air condenser comprising a series of vertical tubes, a chamber beneath the tubes, a condensate receiving trough having an inclined bottom and located in the chamber and into which the condensate from the tubes falls, a discharge spout at the lowest part of the trough extending from the trough through a wall of the chamber, a trap seal the lowest part of the edge of which is on a level with the center of the spout and a valve in the discharge spout.

6. In a condenser, a condensate receiving trough, a discharge spout extending therefrom, means for regulating the flow of the condensate through the spout and a trap seal the lower edge of which is about on the level with the center of the spout, whereby the seal becomes active when the condensation of the vapor equals or exceeds the discharge capacity of the spout and permits complete discharge of the condensate when condensation ceases.

In testimony whereof, I have hereunto subscribed my name.

JOHN L. GRAY.

Witnesses:
H. P. JOSTEN,
W. H. HARTIS.

seal the lower edge of which is about on the level with the center of the spout, whereby the seal becomes active when the condensation of the vapor equals or exceeds the discharge capacity of the spout and permits complete discharge of the condensate when condensation ceases.

In testimony whereof, I have hereunto subscribed my name.

JOHN L. GRAY.

Witnesses:
H. P. JOSTEN,
W. H. HARTIS.

---

Corrections in Letters Patent No. 1,192,889.

It is hereby certified that in Letters Patent No. 1,192,889, granted August 1, 1916, upon the application of John L. Gray, of Webster Groves, Missouri, for an improvement in "Apparatus for Use in Connection with the Distillation of Petroleum and Products Therefrom," errors appear in the printed specification requiring correction as follows: Page 1, line 10, for the word "frictional" read *fractional;* page 2, claim 1, line 65, beginning with the word "the" strike out all to and including the word "them", same page and claim, line 68; same page and claim, line 69, after the word "located" insert the words and comma *the horizontal area of the chamber being greater than that of the trough to afford passages for the vapor between them,;* and that the said Letters Patent should be read with these corrections therein that the same may conform to the record of the case in the Patent Office.

Signed and sealed this 3d day of October, A. D., 1916.

[SEAL.]

F. W. H. CLAY,
*Acting Commissioner of Patents.*

It is hereby certified that in Letters Patent No. 1,192,889, granted August 1, 1916, upon the application of John L. Gray, of Webster Groves, Missouri, for an improvement in "Apparatus for Use in Connection with the Distillation of Petroleum and Products Therefrom," errors appear in the printed specification requiring correction as follows: Page 1, line 10, for the word "frictional" read *fractional;* page 2, claim 1, line 65, beginning with the word "the" strike out all to and including the word "them", same page and claim, line 68; same page and claim, line 69, after the word "located" insert the words and comma *the horizontal area of the chamber being greater than that of the trough to afford passages for the vapor between them,;* and that the said Letters Patent should be read with these corrections therein that the same may conform to the record of the case in the Patent Office.

Signed and sealed this 3d day of October, A. D., 1916.

[SEAL.]

F. W. H. CLAY,
*Acting Commissioner of Patents.*